US009830806B2

(12) United States Patent
Cree et al.

(10) Patent No.: US 9,830,806 B2
(45) Date of Patent: Nov. 28, 2017

(54) SYSTEMS ENABLING TESTING OF FIRE CONTROL PANELS TOGETHER WITH REMOTE CONTROL AND PROVIDING TEXT-TO-SPEECH OF EVENT DATA

(71) Applicant: Tyco New Zealand Limited, Auckland (NZ)

(72) Inventors: Richard Alan Cree, Christchurch (NZ); Harry Hugh Frank Worrall, Christchurch (NZ); Yiping Zhu, Christchurch (NZ)

(73) Assignee: Tyco New Zealand Limited, Auckland (NZ)

(*) Notice: Subject to any disclaimer, the term of this patent is extended or adjusted under 35 U.S.C. 154(b) by 0 days.

(21) Appl. No.: 14/539,741

(22) Filed: Nov. 12, 2014

(65) Prior Publication Data

US 2015/0348399 A1    Dec. 3, 2015

Related U.S. Application Data

(60) Provisional application No. 62/006,705, filed on Jun. 2, 2014.

(51) Int. Cl.
*G08B 25/00* (2006.01)
*G08B 29/12* (2006.01)
(Continued)

(52) U.S. Cl.
CPC ........... *G08B 29/12* (2013.01); *G06F 3/0482* (2013.01); *G06F 3/0488* (2013.01); *G08B 25/14* (2013.01); *G08B 29/145* (2013.01)

(58) Field of Classification Search
CPC .... G08B 25/00; G08B 25/004; G08B 25/006; G08B 25/008; G08B 25/009; G08B 25/12;
(Continued)

(56) References Cited

U.S. PATENT DOCUMENTS 7,113,090 B1 * 9/2006 Saylor ............. G08B 13/19682
340/5.33
7,924,149 B2 * 4/2011 Mendelson .......... G01C 21/206
340/539.11
(Continued)

FOREIGN PATENT DOCUMENTS

WO      2013019659 A1    2/2013
WO      2013102152 A1    7/2013

OTHER PUBLICATIONS

Partial European Search Report, Application No. 15170162.0-1810. dated Oct. 29, 2015.
(Continued)

*Primary Examiner* — Van Trieu
(74) *Attorney, Agent, or Firm* — HoustonHogle LLP

(57) ABSTRACT

A system for enabling one person testing and remote control of a fire control panel and generating text-to-speech audio during a walkthrough test of fire alarm system is disclosed. Typically, a technician interacts with a simulated interface displayed on the display of the mobile computing device. In response, commands are generated and sent to the control panel to cause the control panel to perform requested actions. The control panel then sends updated control panel user interface displayed information to the mobile computing device reflecting technician entered commands. Testing of the detection devices on the fire control panel generates event data that is sent to the mobile computing device, which receives the event data and enables a technician to select filtering options. The event data are then parsed to identify keywords and text-to-speech audio is generated for the filtered event data.

30 Claims, 10 Drawing Sheets

(51) Int. Cl.
*G06F 3/0488* (2013.01)
*G06F 3/0482* (2013.01)
*G08B 25/14* (2006.01)
*G08B 29/14* (2006.01)

(58) Field of Classification Search
CPC .... G08B 29/12; G08B 29/123; G08B 29/126; G08B 29/14; G08B 29/16; G08B 29/18; G06F 3/048; G06F 3/0484; G06F 3/04842; G06F 3/04845; G06F 3/0488; G06F 3/04847; G05B 23/00; G05B 23/02
See application file for complete search history.

(56) References Cited

U.S. PATENT DOCUMENTS

| | | | | |
|---|---|---|---|---|
| 8,797,531 B2* | 8/2014 | Knox | ............... | G01N 21/53 356/337 |
| 9,057,485 B2* | 6/2015 | Knox | ............... | G01N 21/53 |
| 2007/0109114 A1* | 5/2007 | Farley | ............... | G08B 17/00 340/506 |
| 2011/0071656 A1 | 3/2011 | McKiel, Jr. | | |
| 2012/0032794 A1* | 2/2012 | Barrieau | ............... | G08B 29/181 340/514 |
| 2012/0140231 A1* | 6/2012 | Knox | ............... | G01N 21/53 356/442 |
| 2012/0275588 A1 | 11/2012 | Gregory | | |
| 2014/0266717 A1* | 9/2014 | Warren | ............... | G06Q 10/20 340/540 |
| 2014/0282934 A1* | 9/2014 | Miasnik | ............... | G06F 17/30861 726/5 |

OTHER PUBLICATIONS

"Vigilant MX1-Au Fire Alarm System: Operator Manual." LT0439, Issue 1.5. Oct. 25, 2013. 174 pages.

EP 15170162.0 Extended Search Report, dated Feb. 15, 2016. Nine pages.

* cited by examiner

| DATE | TIME | ID (ZONE/POINT NUMBER) | STATUS/CONDITION | DESCRIPTIVE TEXT |
|---|---|---|---|---|
| 01/05/14 | 17:21:55 | Zone 1 | Disable | Manual Call Point |
| 01/05/14 | 17:21:55 | Pnt 241/30/3 | Input activated | Disables Routing |
| 01/05/14 | 17:22:07 | Zone 1 | Enable | Manual Call Point |
| 01/05/14 | 17:22:07 | Pnt 241/30/3 | Input deactivated | Disables Routing |
| 01/05/14 | 17:22:20 | Zone 2 | Auto Reset Test | Building Foyer |
| 01/05/14 | 17:22:20 | Zone 2 | Disable | Building Foyer |
| 01/05/14 | 17:22:20 | Pnt 1/3/1 | Auto reset start | CO Detector in Foyer |
| 01/05/14 | 17:22:20 | Pnt 1/3/2 | Auto reset start | CO Detector in Foyer |
| 01/05/14 | 17:22:20 | Pnt 241/30/3 | Input activated | Disables Routing |
| 01/05/14 | 17:22:40 | Zone 3 | Auto Reset Test | Disable |
| 01/05/14 | 17:22:40 | Zone 3 | Disable | Storeroom |
| 01/05/14 | 17:22:40 | Pnt 1/7/1 | Auto reset start | Storeroom |
| 01/05/14 | 17:22:40 | Pnt 1/53/1 | Auto reset start | Inwards Goods Inspection Area |
| 01/05/14 | 17:22:40 | Pnt 1/53/2 | Auto Reset Test | Inwards Goods Inspection Area |
| 01/05/14 | 17:22:55 | Zone 4 | Disable | Castle Meeting Room |
| 01/05/14 | 17:23:21 | Pnt 241/G/0 | Alarm | Video Conferencing Alcove |
| 01/05/14 | 17:23:21 | Pnt 24/1/0 | Operate | Video Conferencing Alcove |
| 01/05/14 | 17:23:51 | Pnt 24/1/0 | Operate | Ancillary Relay 1 |
| 01/05/14 | 17:23:51 | Pnt 24/1/220 | Operate | Ancillary Relay 3 |
| 01/05/14 | 17:23:55 | Pnt 24/G/0 | De-operate | Ancillary Relay 1 |
| 01/05/14 | 17:23:55 | Pnt 24/8/0 | De-operate | Inwards Goods Inspection Area |
| 01/05/14 | 17:23:55 | Pnt 24/1/220 | De-operate | Ancillary Relay 3 |

SYSTEMS ENABLING TESTING OF FIRE CONTROL PANELS TOGETHER WITH REMOTE CONTROL AND PROVIDING TEXT-TO-SPEECH OF EVENT DATA

RELATED APPLICATIONS

This application claims the benefit under 35 USC 119(e) of U.S. Provisional Application No. 62/006,705, filed on Jun. 2, 2014, which is incorporated herein by reference in its entirety.

BACKGROUND OF THE INVENTION

Fire alarm systems are often installed within buildings such as commercial, residential, or governmental buildings. Examples of these buildings include offices, hospitals, warehouses, schools, shopping malls, government offices, and casinos. The fire alarm systems typically include fire control panels (or control panels), fire detection devices and fire annunciation devices, which are installed throughout the buildings. Some examples of fire detection devices include smoke detectors, carbon monoxide detectors, flame detectors, temperature sensors, and/or pull stations (also known as manual call points). Some examples of fire annunciation devices include speakers, horns, bells, chimes, light emitting diode (LED) reader boards, and/or flashing lights (e.g., strobes). Additionally, some fire alarm systems may also include security devices such as surveillance cameras, access control readers, and door controllers, to list a few examples.

The fire detection devices monitor the buildings for indicators of fire. Upon detection of an indicator of fire, the device is activated and a signal is sent from the activated device to the control panel. The control panel then initiates an alarm condition by activating audio and visible alarms of the fire annunciation devices of the fire alarm system. Additionally, the control panel may also send a signal to a fire department or fire brigade, a central receiving station, local monitoring stations, and/or other building alarm/notification systems (e.g., public address systems).

Typically, building codes, local laws, standards, and/or insurance providers require that the fire detection and fire annunciation devices are periodically tested (e.g., monthly, quarterly, or annually) to verify that the fire detection and fire annunciation devices are physically sound, unaltered, working properly, and located in their assigned locations. This testing of the fire detection and fire annunciation devices is often accomplished with a walkthrough test.

Historically, walkthrough tests were performed by a team of at least two technicians, also known as inspectors. The first technician walked through the building and manually activated each fire detection or fire annunciation device while the second technician remained at the control panel to verify that the control panel received a signal from the activated device and/or that the fire annunciation device properly produced its form of annunciation. The technicians would typically communicate via two-way radios or mobile phones to coordinate the testing of each device. In some cases, the technicians might even have resorted to comparing hand written notes of the tested devices. After a group of fire detection and fire annunciation devices was tested, the technician at the panel reset the control panel while the other technician moved to the next group of fire detection or fire annunciation devices.

Alternatively, the walkthrough test could be carried out by one technician, with the technician having to return to the control panel after testing every (few) detector(s) to see what signals/events had been received.

SUMMARY OF THE INVENTION

In general, the present system and method enable the walkthrough test to be performed by possibly one technician with the information from the control panel being conveyed to a mobile computing device of the technician. This enables the single technician to confirm that the correct devices have been tested, that the control panel received signals from the activated devices, and that information programmed and associated with the activated devices is correct.

The present invention is directed to allowing for remote control of the control panel with a mobile computing device. Additionally, the present invention is directed to generating text-to-speech (TTS) audio of event data generated by the control panel during the walkthrough test.

In one embodiment, to remotely control the control panel, a technician might first activate a simulation mode on the mobile computing device. As the technician interacts with a simulated control panel interface displayed on the mobile computing device, commands are generated and sent to the control panel. The control panel then sends updated control panel status information to the mobile computing device. The simulated interface on the mobile computing device is then updated with the updated control panel status information.

In other aspects of the embodiment, the generation of text to speech audio for event data is performed by the mobile computing device. The mobile computing device receives the event data and the technician is able to select filtering options (e.g., keyword selection). The event data are then parsed to identify keywords and text-to-speech audio is generated for the filtered event data.

In general, according to one aspect, the invention features a system for enabling remote control of a fire alarm system. The system comprises a control panel that includes a control panel user interface for enabling a user to enter commands into the control panel and for the user to receive status information from the control panel. Additionally, the system further comprises a mobile computing device that displays a simulated control panel user interface that is updated with the current status information of the control panel. Additionally, the mobile computing device generates commands that are transferred to the control panel in response to user manipulation of the simulated control panel user interface.

In general, the system further includes a remote access unit that receives the displayed information from the control panel and forwards the displayed information to the mobile computing device. Additionally, the remote access unit receives commands from the mobile computing device and transfers the commands to the control panel.

In one embodiment, the commands that are transferred to the control panel cause the control panel to perform the requested commands.

In another embodiment, the commands are generated in response to input received on a touchscreen display of the mobile computing device, which is displaying the simulated control panel user interface.

Typically, the displayed information includes light emitting diode status information and text information displayed on the control panel.

In general, according to another aspect, the invention features a system for providing event data to a technician testing a fire alarm system. The system includes a control panel monitoring fire detection devices and generating a stream of event data. The system further includes a mobile computing device that receives the stream of event data of the control panel, displays the stream of event data, and generates text-to-speech audio of the event data.

Preferably, the system further includes a remote access unit that receives the stream of event data from the control panel and sends the event data to mobile computing device.

Generally, the mobile computing device enables filtering of the stream of event data to reduce the amount of event data audibly generated by the mobile computing device and only converts part of the stream of event data to text-to-speech audio. Additionally, filtering of the stream of event data includes selecting keywords and identifying the selected keywords in the stream of event data and only generating text-to-speech audio for the parts of event data with the selected keywords. Furthermore, filtering of the stream of event data also includes selecting keywords and identifying the selected keywords in the stream of event data and ignoring the parts of event data without the selected keywords.

In embodiments, the mobile computing device typically includes an application executing on the mobile computing device, the application bypassing any login screen in response to the mobile computing device receiving new event data from the control panel.

In one example, the mobile computing device saves the stream of event data to a log file. In another example, the mobile computing device sends the log file and/or stream of event data to a central communication system, which stores the log file and/or stream of event data.

In a typical implementation, the stream of event data include a time that the event data was generated, a date that the event data was generated, identification number of a device that was activated, status of the device that was activated, and descriptive text associated with the device.

In general according to another aspect, the invention features a method or system for testing a fire alarm system. The system comprises a control panel monitoring fire detection devices and generating a stream of event data, a remote access unit for providing remote wireless access and including at least one relay, and a mobile computing device that receives the stream of event data of the control panel via the remote access unit, and enables user control of the relay.

In general according to still another aspect, the invention features mobile computing device that receives event data from a control panel monitoring fire detection devices. The mobile computing device displays the stream of event data and generates text-to-speech audio of the event data.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings:

FIG. 5 is a table illustrating the event data that are generated by the control panel.

FIG. 7 is a table illustrating filtered event data, which are filtered in order to limit the text to speech information to only the important information.

DETAILED DESCRIPTION OF THE PREFERRED EMBODIMENTS

The invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As used herein, the term "and/or" includes any and all combinations of one or more of the associated listed items. Further, the singular forms and the articles "a", "an" and "the" are intended to include the plural forms as well, unless expressly stated otherwise. It will be further understood that the terms: includes, comprises, including and/or comprising, when used in this specification, specify the presence of stated features, integers, steps, operations, elements, and/or components, but do not preclude the presence or addition of one or more other features, integers, steps, operations, elements, components, and/or groups thereof. Further, it will be understood that when an element, including component or subsystem, is referred to and/or shown as being connected or coupled to another element, it can be directly connected or coupled to the other element or intervening elements may be present.

Figure 1:
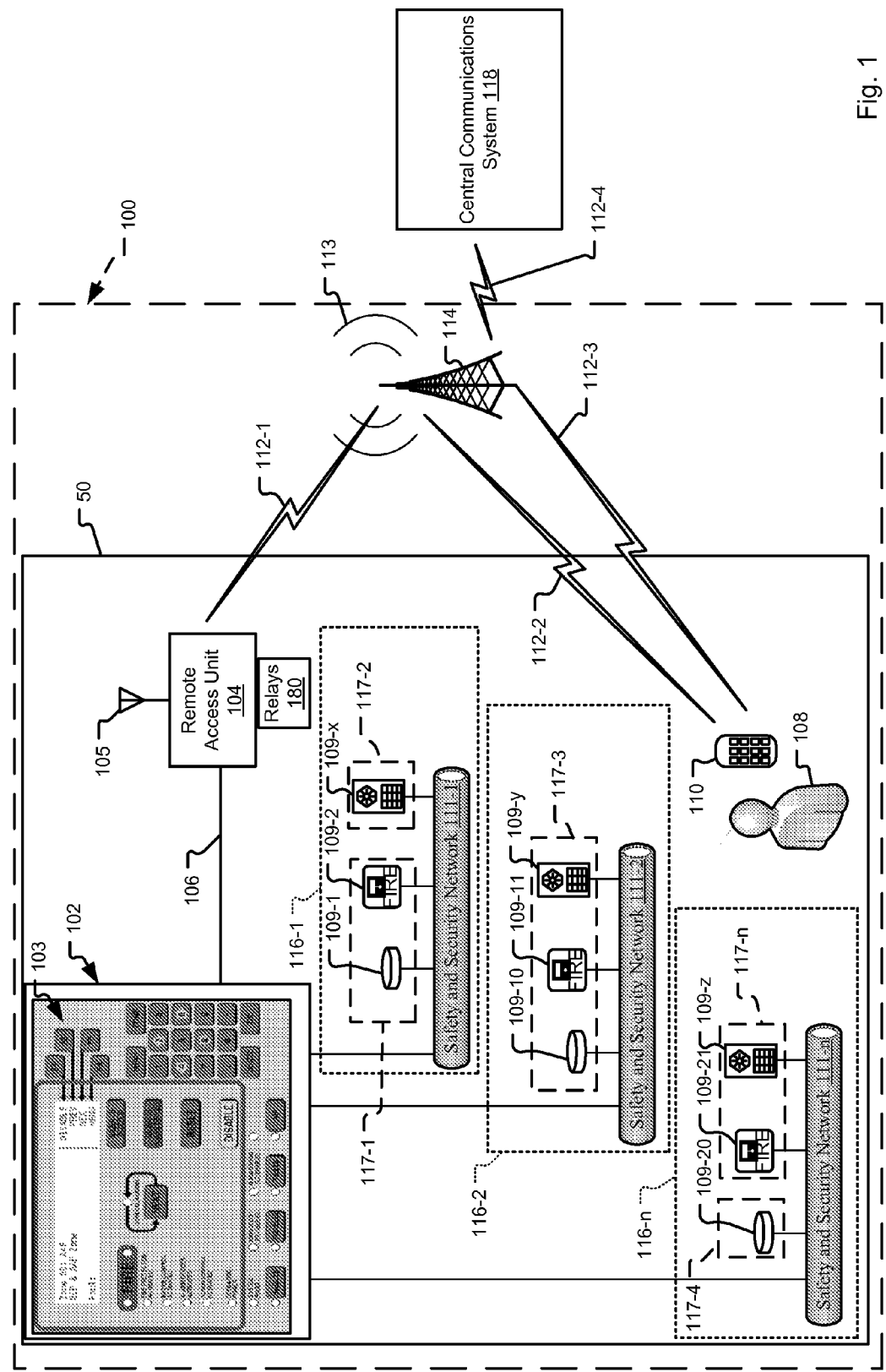
FIG. 1 is a block diagram illustrating a fire alarm system that includes a control panel, a remote access unit, a mobile computing device, and a wireless network.

FIG. 1 is a block diagram illustrating a fire alarm system 100, which includes a control panel 102, fire detection devices and fire annunciation devices (e.g., 109-1 to 109-x, 109-10 to 109-y, and 109-20 to 109-z), a remote access unit 104, a mobile computing device 110, and a wireless network 113.

In a typical implementation, the control panel 102 and the fire detection devices and annunciation devices 109-1 to 109-z are installed within a building 50. This building 50 could be residential, commercial or governmental. Examples of residential, commercial or governmental buildings include apartment complexes, hotels, offices, hospitals, warehouses, schools, shopping malls, government offices, and casinos.

The control panel 102 monitors the fire detection devices, which monitor the building 50 for indicators of fire. In response to detection of indicators of fire (e.g., smoke, a rapid rise in temperature, user activation of a pull station, and/or detection of hazardous gases) by the fire detection devices, the control panel 102 receives a signal from fire detection device(s) and initiates an alarm condition. Upon entering the alarm condition, the control panel 102 activates audio and visible alarms of the fire annunciation devices. Additionally, the control panel 102 may also send signals to a local fire department or fire brigade, central monitoring station, and/or other building alarm/notification systems (e.g., public address systems).

The control panel 102 generally includes a control panel interface 103, which provides a user interface that enables installers, fire fighters, maintenance workers, and/or technicians to interact and/or operate the control panel 102.

The fire detection devices typically include smoke detectors, carbon monoxide detectors, flame detectors, temperature sensors, and/or pull stations (also known as manual call points). Similarly, examples of the fire annunciation devices generally include speakers, horns, bells, chimes, light emitting diode (LED) reader boards, and/or flashing lights (e.g., strobes). In the illustrated example, the fire detection and fire annunciation devices 109-1 to 109-z are installed in separate zones 116-1 to 116-n of the building. For example, each floor of the building 50 could be a separate zone. Additionally, each zone 116-1 to 116-n typically encompasses one or more rooms 117-1 to 117-n of the building 50. These rooms 117-1 to 117-n could be conference rooms, hallways, bathrooms, lobbies, operating rooms, hotel rooms, school rooms, gymnasiums, retail stores, elevators, or employee offices, to list a few examples.

The control panel 102 and the fire detection and fire annunciation devices 109-1 to 109-z are connected to safety and security networks 111-1 to 111-n of the building 50. Each network (or "loop") supports data and/or analog communication between its respective devices and the control panel 102. Additionally, in some embodiments, the fire alarm system 100 may also include security devices such as surveillance cameras, door controllers, access control readers, or motion sensors. These security devices may be connected to the networks 111-1 to 111-n and may or may not be tested during a walkthrough test.

The remote access unit (or RAU) 104 is connected to the control panel 102 typically as part of the process for testing the system. In a current implementation, the remote access unit 104 is connected to the control panel via a printer output port of the control panel 102 with an RS-232 (serial connection) cable 106. Alternative embodiments, however, may utilize other wired connection interfaces such as universal serial bus (USB) cables, Ethernet (IEEE 802.3) cables (e.g., Cat 5 or Cat 6), or a parallel printer port connection, to list a few examples. Similarly, still other embodiments of this connection may include wireless connections such as Wi-Fi, sub-Giga Hertz serial, Bluetooth, or ZigBee, for example. In yet another example, some or all of the functionality of the RAU 104 is integrated into the control panel 102, a fire brigade transmission device, or digital communicator.

In a preferred embodiment, the remote access unit 104 includes a antenna 105 to connect the remote access unit 104 to a wireless network 113 (e.g., a mobile broadband network, cellular network, or Wi-Fi network) via a wireless communication link 112-1. The event data from the remote access unit 104 are typically routed through one or more radio towers 114 of the wireless network 113. Alternatively, in embodiments that implement Wi-Fi, the RAU 104 communicates directly to the mobile computing device or through an access point. That is, the wireless connection would not be routed through the wireless tower 114.

In some embodiments of the fire alarm system, the RAU 104 also transmits the event data to a central communications system 118 via communication links 112-1 and 112-4. While the connection between the wireless tower 114 and the central communications system 118 is illustrated as a wireless connection, the connection could also be made via wired networks.

During the walkthrough test of the fire alarm system 100, a technician 108 operates the mobile computing device 110 to control the control panel 102 and receive text-to-speech audio. This device 110 communicates with the remote access unit 104 via the wireless network 113. In the illustrated embodiment, the mobile computing device 110 connects to the remote access unit 104 via wireless communication links 112-1 and 112-2. In a current embodiment, the mobile computing device 110 is a smart phone mobile computing device. Alternatively, the mobile computing device 110 could be other mobile computing devices such as laptop computers, tablet computers, or phablet computers (i.e., a mobile device that is typically larger than a smart phone, but smaller than a tablet), to list a few examples.

In the illustrated embodiment, the mobile computing device 110 also communicates with the central communications system 118 via the wireless network 113. This connection is illustrated by wireless communication links 112-3 and 112-4. The central communications system 118 provides storage and backup of data received by the mobile computing device 110. Thus, if the mobile computing device 110 is lost, stolen, or damaged, for example, the data can still be accessed or recovered by the technician 108 or other authorized personnel. Additionally, in a current implementation, the data are also electronically mailed to one or more designated electronic mail addresses during (e.g., at periodic intervals) and/or after the walkthrough test.

Figure 2:
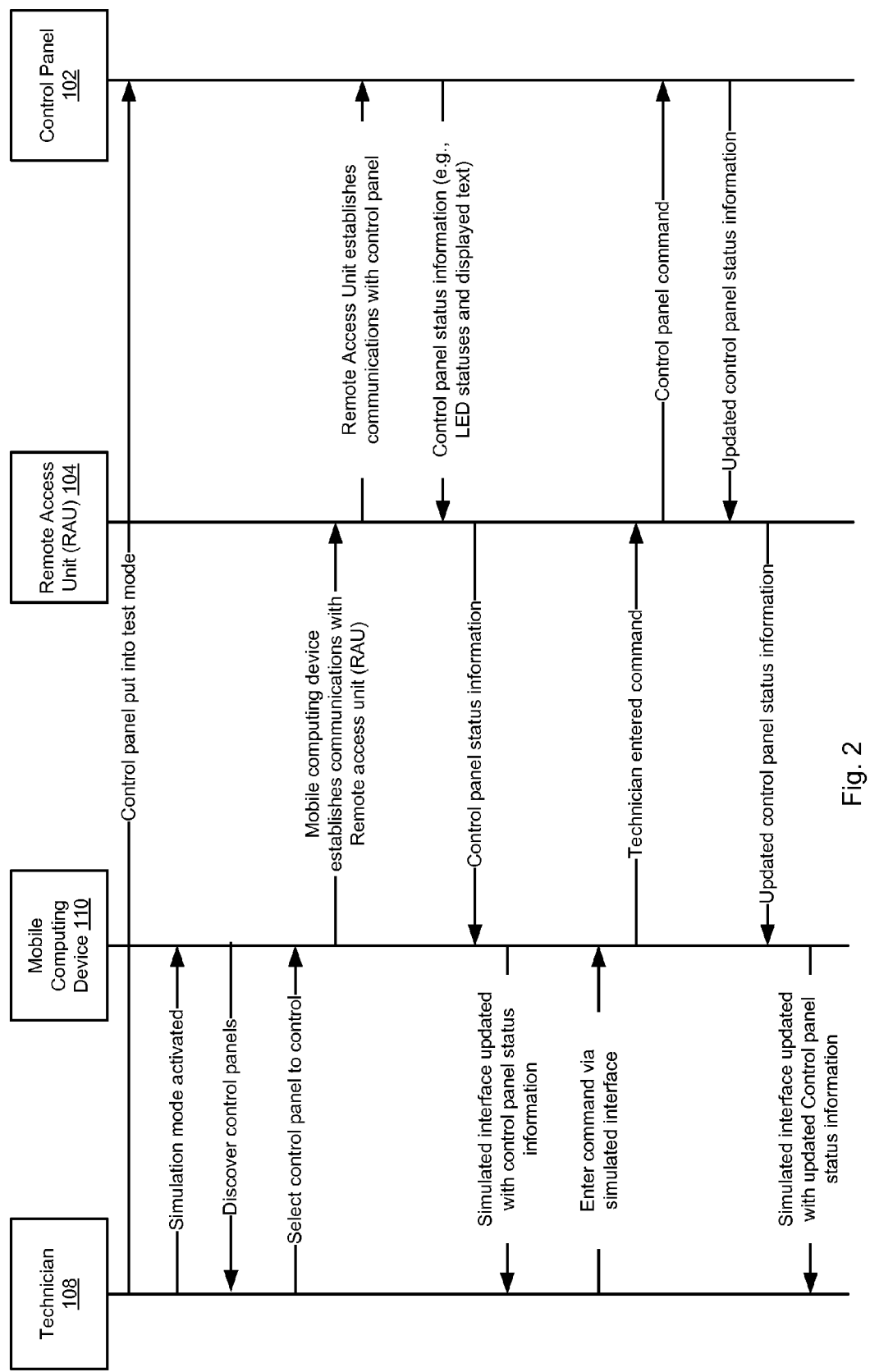
FIG. 2 is a sequence diagram illustrating how the control panel, the remote access unit, and the mobile computing device interact to enable remote control of the control panel with the mobile computing device.

FIG. 2 is a sequence diagram illustrating how the control panel 102, the remote access unit 104, the mobile computing device 110, and the technician 108 interact to enable remote control of the control panel 102 via the mobile computing device 110.

First, the technician 108 puts the control panel 102 into test mode. In an alternative embodiment, the technician 108 instructs the control panel to place only one or more of the zones into test mode. Typically, the test mode prevents the control panel 102 from initiating an alarm condition in response to receiving signals indicative of fire from the devices 109-1 to 109-z. Preferably, the devices 109-1 to 109-z provide visual and/or audible indication (e.g., flashing LEDs or audible noises) that the devices are in test mode. This is to prevent the technician 108 from inadvertently activating a device that is not in test mode and causing an evacuation of the building 50.

Figure 2A:
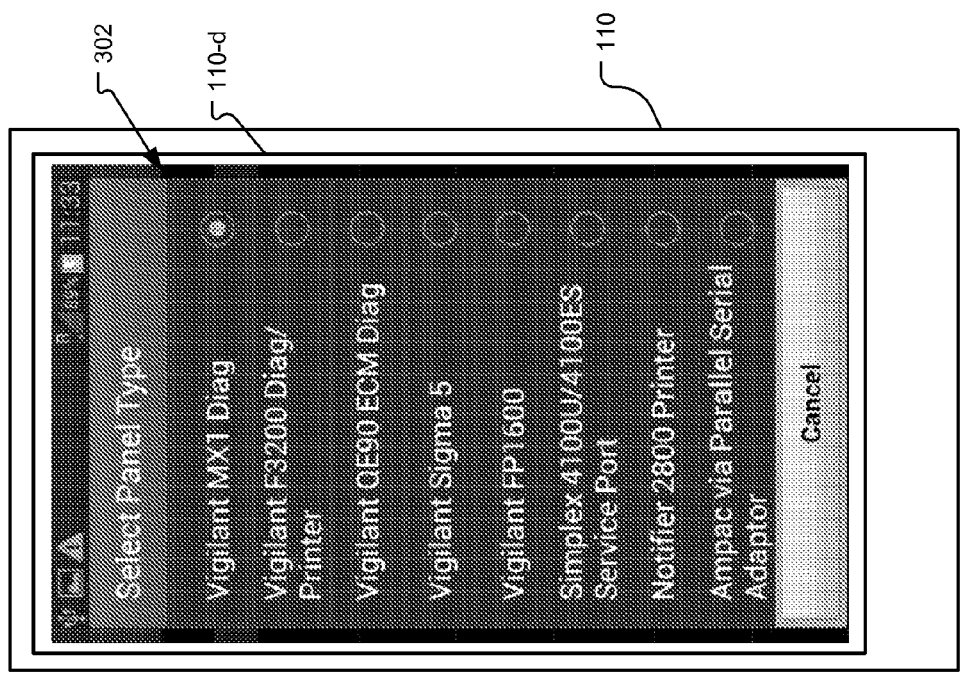
FIG. 2A illustrates an example of a panel type selection configuration interface, which is displayed on the display of the mobile computing device.

Next, the technician 108 activates a simulation mode on the mobile computing device 110. In a current implementation, this is done by invoking an application (or "app") that is installed on the mobile computing device 110. Next, the app discovers control panels that are available to control via the app. Then, the technician 108 selects one of the control panels to operate via the app on the mobile computing device 110. (FIG. 2A illustrates a user interface 302 that is displayed on a touchscreen display 110-d of the mobile computing device 110 to enable the selection of the proper control panel type.) Alternatively, the technician 108 may be able to select two or more control panels, which are controlled by alternating between simulated interfaces, for example.

Upon selection of the control panel by the technician 108, the mobile computing device 110 establishes communications with the remote access unit (RAU) 104, which then establishes communications with the selected control panel 102.

In the next step, control panel status information (e.g., statuses and displayed text) is sent to the remote access unit 104, which sends the control panel status information to the mobile computing device 110. Next, a simulated control panel interface (simulated interface), which is displayed on a touchscreen display of the mobile computing device 110, is updated with the control panel status information.

In response to interaction of the simulated interface by the technician 108, a command (e.g., a button press) is entered via the simulated control panel interface. In one example, the technician could view recent alarm or faults detected by the control panel 102 by using a "Next" button, which allows a technician to "cycle through" recent alarms. In another example, the technician is able to silence/un-silence activated alarms.

The entered command is then sent from the mobile computing device 110 to the remote access unit 104, which forwards the command to the control panel 102. The control panel 102 receives the command and performs the requested action (e.g., the button press). The control panel 102 then sends updated control panel status information to the remote access unit 104, which forwards the updated control panel status information to the mobile computing device 110. Next, the simulated interface is updated to show the updated control panel status information.

This process is repeated whenever the technician enters a command from the mobile computing device 110. While not illustrated in the figure, the simulated interface may be periodically "refreshed." That is, the control panel 102 sends updated control panel status information to the mobile computing device 110 at periodic intervals regardless of whether any commands are sent from the mobile computing device 110. Similarly, the control panel 102 sends updated control panel status information to the mobile computing device 110 in response to any status changes (e.g., to unsolicited signals from devices not in test mode).

While the illustrated example only illustrates one simple example, the simulated interface provides all of the functionality of the control panel user interface and allows the technician to monitor and operate the control panel via the mobile computing device as if the technician were standing in front of the control panel using the control panel user interface.

Figure 3:
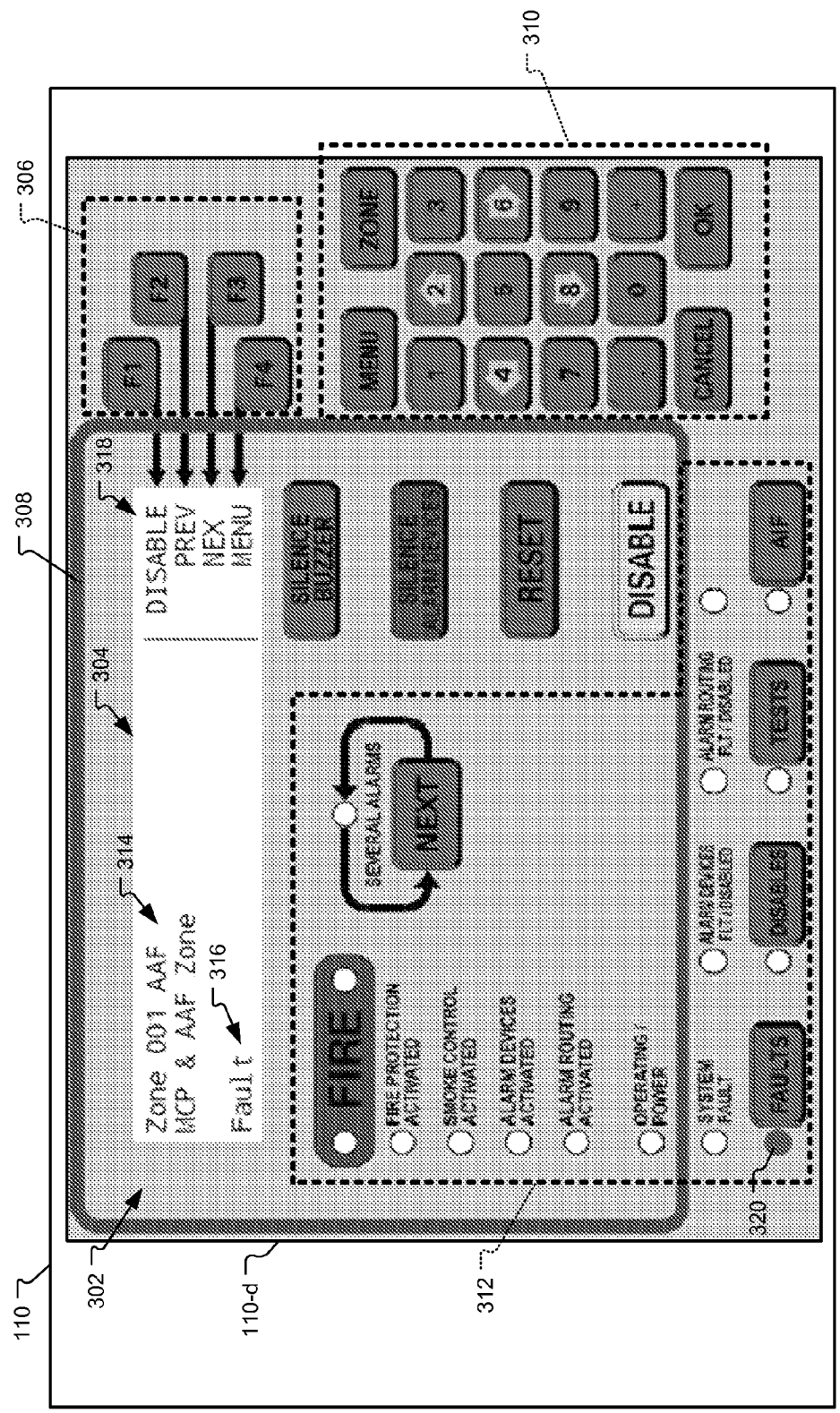
FIG. 3 illustrates a simulated control panel interface that is displayed on the display of the mobile computing device.

FIG. 3 illustrates the simulated control panel interface (or simulated interface) 302 that is displayed on a touchscreen display 110-d of the mobile computing device 110.

This simulated control panel interface 302 displays the same or similar interface (e.g., keys, buttons, and displayed text) as appears on the control panel 102. In an alternative embodiment, the layout of the simulated interface may be modified to be displayed on mobile computing devices. The alternative layout, however, still typically retains all or most of the functionality of the control panel interface.

Additionally, the mobile computing device 110 typically stores different simulated interfaces for different models and manufacturers of control panels. This is because different buildings and different fire alarm systems often use different control panels, which may have different interfaces. By storing different simulated interfaces, the mobile computing device 110 is able to display a simulated interface that matches the interface of the control panel of fire alarm system that the technician is currently testing.

In the illustrated embodiment, the simulated control panel interface 302 includes a simulated graphic and/or alphanumeric display (e.g., a simulated liquid crystal display) 304, simulated "soft keys" 306, simulated control panel controls 308, simulated keypad or keyboard 310, and simulated status indicators 312. Additionally, alternative embodiments of the simulated control panel interface may also include simulated zone indicators (e.g., LED indicators), which are not shown in the illustrated embodiment.

The simulated alphanumeric display 304 displays details about alarms and/or faults detected by the control panel 102. Further, the simulated alphanumeric display 304 presents to the user additional information such as menus, options, and/or messages. The information that is typically displayed in the simulated alphanumeric display 304, without the technician (or operator) intervention, is often referred to as the "base display." This base display may include the time, date, a building name/ID, a control panel model/manufacturer and a system status, to list a few examples. In the illustrated example, a fault has been detected. Thus, the simulated alphanumeric display 304 currently displays zone information 314, status information 316, and soft key options 318.

The simulated soft keys (F1, F2, F3, and F4) 306 have varying functions depending on the information displayed in the simulated alphanumeric display 304. Generally, each key's function is shown by the text displayed at the right side of the simulated alphanumeric display 304 (e.g., soft key functions/options 318).

The simulated status indicators (e.g., LED indicators) 312 show the presence of faults, disabled devices, tests in progress, and a power status, for example. The simulated status indicators 312 also include associated keys (e.g., Faults, Disables, Tests, AIF (Alarm Investigation Facility)), which provide a direct way to display information in the simulated alphanumeric display 304. Because a fault was detected by the control panel, the fault indicators 320 have been activated and status information 316 is displayed in the simulated alphanumeric display 304.

The control panel controls are indicated within the border of box 308. These controls are used by fire fighters or fire brigade personnel during an alarm condition.

The simulated keypad 310 includes numeric keys and commonly-used keys: OK, CANCEL, MENU, and ZONE. The OK and CANCEL keys are used to confirm or cancel commands, respectively. The MENU key displays the current possible actions for the item displayed, and ZONE keys provide direct access to zone functions. Additionally, CANCEL also enables the operator (e.g., technician 108, firefighter, or fire brigade personnel) to "move back" within a displayed menu. Additionally, holding CANCEL will return to the base display.

The simulated Zone indicators (not shown) generally show the status of different zones or groups of zones in the building 50. For example, a flashing red indicator is an alarm. A steady red indicator shows operated, or if the zone is disabled, a disabled alarm or operate state. A flashing yellow indicator is a fault. And a steady yellow indicator shows a disabled zone. Additionally, in alternative embodiments, these indicators can be configured to convey other non-alarm statuses (e.g., devices need maintenance or repair, low battery, device blocked, to name but a few possibilities).

Figure 4:
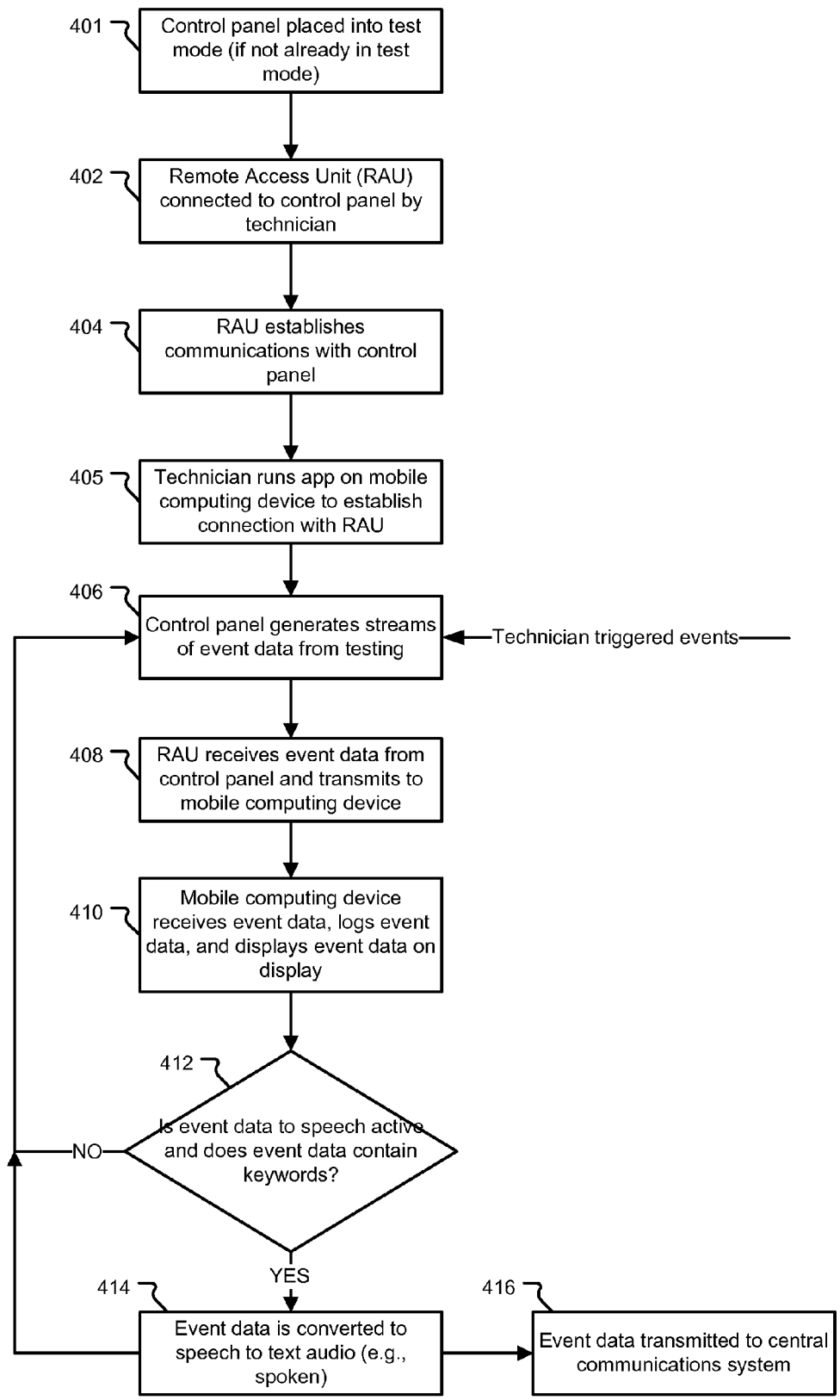
FIG. 4 is a flowchart illustrating the steps performed to transfer streams of event data from the control panel to the mobile computing device.

FIG. 4 is a flowchart illustrating the steps performed by the control panel 102, the remote access unit 104, and the mobile computing device 110 to transfer streams of event data from the control panel 102 to the mobile computing device 110 to generate text-to-speech audio of the event data.

In the first step 401, the control panel 102 is placed into test mode (if the control panel 102 is not already in test mode). The remote access unit (RAU) 104 is then connected to the control panel 102 by the technician 108 in step 402. The RAU 104 establishes communications with the control panel 102 in step 404. Next, in step 405, the technician 108 runs the app on the mobile computing device 110, which connects to the remote access unit 104 via the wireless data network 113.

In step 406 the control panel generates streams of event data from the technician's 108 test activity (e.g., technician triggered events). Then, in step 408, the RAU receives the event data from the control panel and transmits the event data to the mobile computing device 110 via the wireless data network 113.

Next, in step 410, the mobile computing device receives the event data 110, displays it in the display (or screen), and logs the event data into a history file. Typically, this history file is stored in the mobile computing device's non-volatile memory.

In the next step 412, if the event data to speech mode is activated, and the event data contain specific keywords, then the mobile computing device 110 converts the text to speech and this is emitted from the device's 110 loudspeaker or headset in step 414. Additionally, in step 416, event data is transmitted to the central communications system 118 to provide storage and backup of data. Step 416 is not a required step, however, because the step may or may not be performed depending on the configuration of the fire alarm system.

FIG. 5 is a table 500 illustrating the event data 502 that is serially generated by the control panel 102.

In typical implementation, the event data 502 is generated and stored as lines of text in a log file. FIG. 5 illustrates an example of a log file and the generated event data. Typically, the event data includes or specifies a time that the event data was generated, a date the event data was generated, an identification number of a device that was activated, a status of the device that was activated, and a descriptive text associated with the device.

Figure 6:
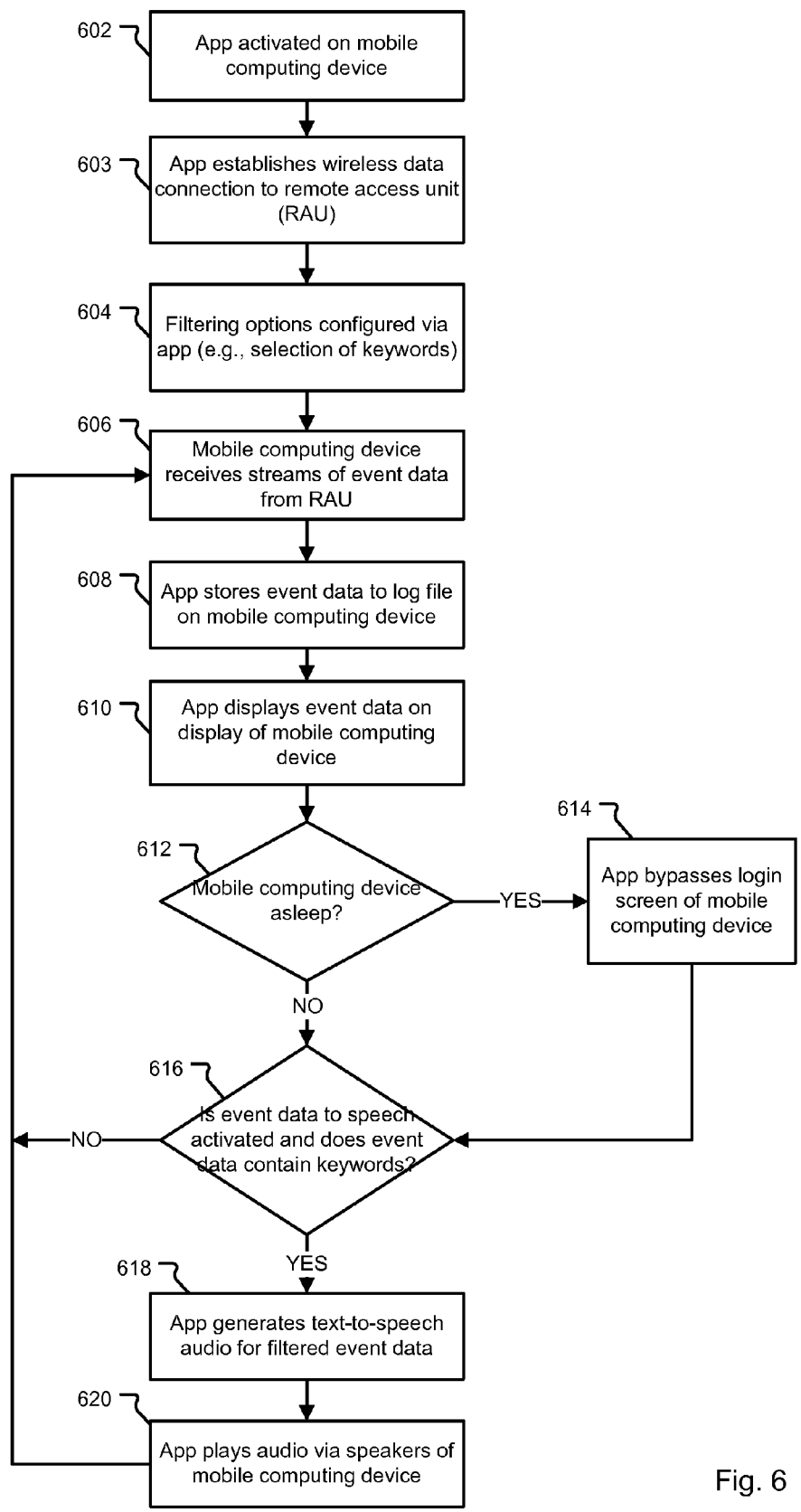
FIG. 6 is a flowchart illustrating the steps performed by the mobile computing device to filter the streams of event data and generate text-to-speech audio.

FIG. 6 is a flowchart illustrating the steps performed by the mobile computing device 110 to display the received event data, filter the streams of event data, and generate text-to-speech audio.

In the first step 602, the app is activated on the mobile computing device 110 (if not already activated). In step 603 the app automatically establishes a wireless data connection to the remote access unit 104 via the wireless data network 113. Filtering options are then configured (e.g., selection of keywords) via the app in step 604.

Figure 6B:
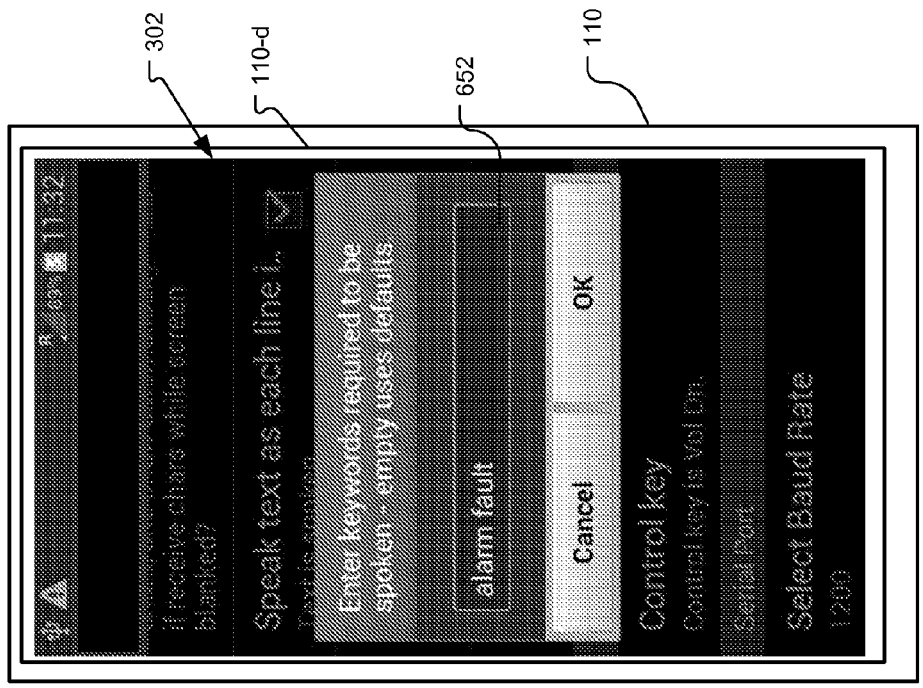
FIGS. 6A-6C illustrate a user interface that is displayed on a touchscreen display of the mobile computing device to enable the configuration of the text-to-speech audio and keyword filtering and relay operation.
Figure 6A:
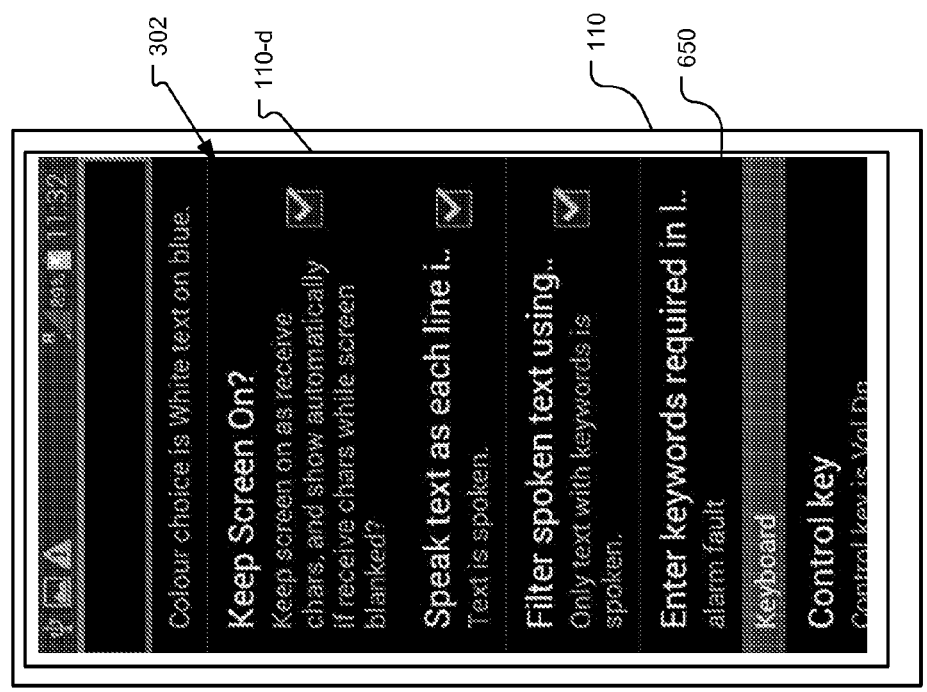
Figure 6C:
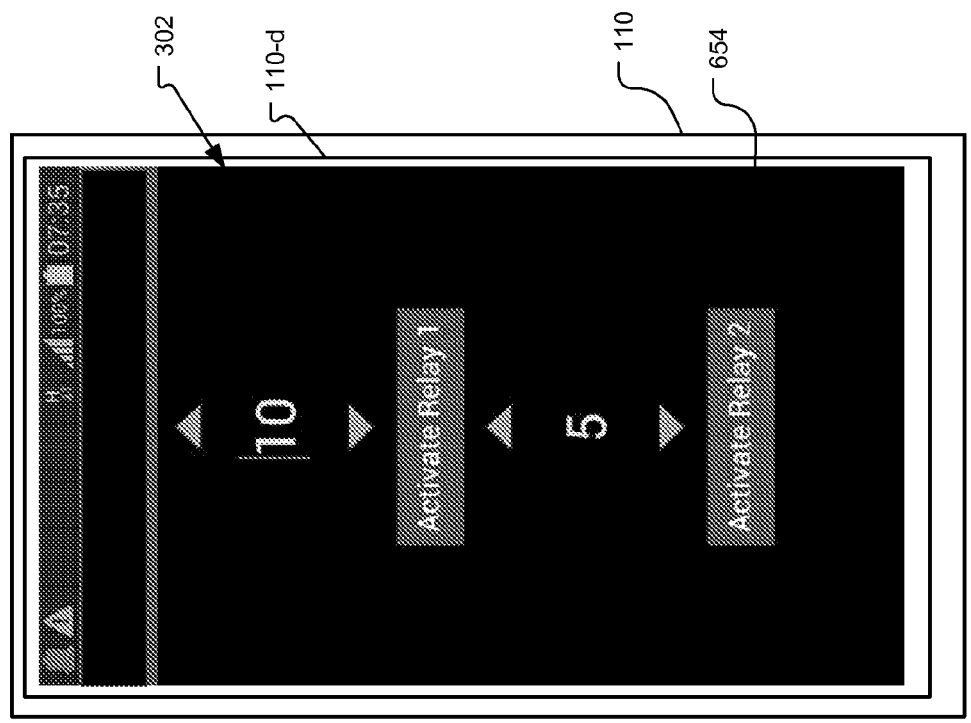

FIGS. 6A-6C illustrate a user interface 302 that is displayed on a touchscreen display 110-d of the mobile computing device 110 to enable the configuration of the text-to-speech audio and keyword filtering and relay operation.

In more detail, FIG. 6A shows the first check box of the interface that controls whether the display 110-d of the computing device 110 stays active to display new events. The second check box is used to enable the text-to-speech audio function in which event data to speech mode is provided. The third check box is used to enable the filtering function of the event data to speech mode. Below, the third check box is a keyword entry region 650 for user entry of keywords. When the user selects the keyword entry region 650, a keyword entry box 652 is displayed as shown in FIG. 6B. Here, the user enters the keywords such as "alarm fault." In a typical implementation, the technician selects keywords that must be present in the streams of event data in order to generate text-to-speech audio. Alternatively, the keywords may be used to ignore streams of event data.

FIG. 6C is used to provide for remote relay control. The remote access unit 104 contains two relay outputs 180 that can be controlled from this screen of the app. The screen allows each relay to be activated for a period of time from 1-60 s. In examples, the relays are used for any sort of remote control function where there is a need to close (or open) a circuit remotely from the mobile computing device 110. For example, when doing the walk test on some types of older fire panels, it is necessary to reset the fire panel after testing each detector. The remotely controllable relay output accomplishes this by activating an external reset input of the panel, or even disconnecting power to the fire detectors so that it powers down and up again and so resets its alarm condition. Or, in the example of a sprinkler system the relay output is used to activate a drain solenoid at the end of a length of pipework. This simulates the operation of the most distant sprinkler head. The technician is at the flow sensor for the sprinkler system which could be in the fire control room in the basement. By pressing the activate button on the screen the technician is able to activate the relay and the solenoid for a length of time and so check that the flow sensor detects the flowing of water in the pipework.

Another use could be for a technician doing sound pressure level tests of the fire alarm or evacuation system in a building. Rather than activate the system for the duration of time required to walk around the whole building making measurements, the relay output could be used to activate the system for as long as necessary to make the sound level measurement at each test location.

The reason for having a time period that sets the period for which the relay is open or closed and not separate on/off buttons is to avoid the possibility that the technician activates the relay output, but due to communication problems between the mobile computing device 110 and the RAU 104 cannot send the turn off relay command to the RAU.

Next, the mobile computing device 110 receives streams of event data from the remote access unit 104 in step 606. The app stores the received event data to a log file on the mobile computing device 110 in step 608 and then in step 610 displays the information on the screen of the mobile computing device 110. If the mobile computing device 110 is in a sleep mode (screen turned off), step 612, then the app turns the screen on and bypasses the login screen of the mobile computing device so that the event data can be seen by the technician 108 directly, step 614, if it has been configured to stay active to display new event data.

In step 616 if event data to speech mode is active then the app parses the event data to identify the presence of the keywords (e.g., alarm fault) as entered into the keyword entry box 652. If any of the keywords are present then the app generates text-to-speech audio from the event data in step 618. The event data to speech mode app then plays the generated audio via speakers of the mobile computing device 110 in step 620. In an alternative embodiment, the presence of keywords could be used to trigger other events/actions. For example, if fire detection or fire annunciation device is faulty (i.e. does not pass the walkthrough test and needs to be replaced), a search of inventory could be triggered to locate a replacement fire detection or fire annunciation device.

Figure 7:
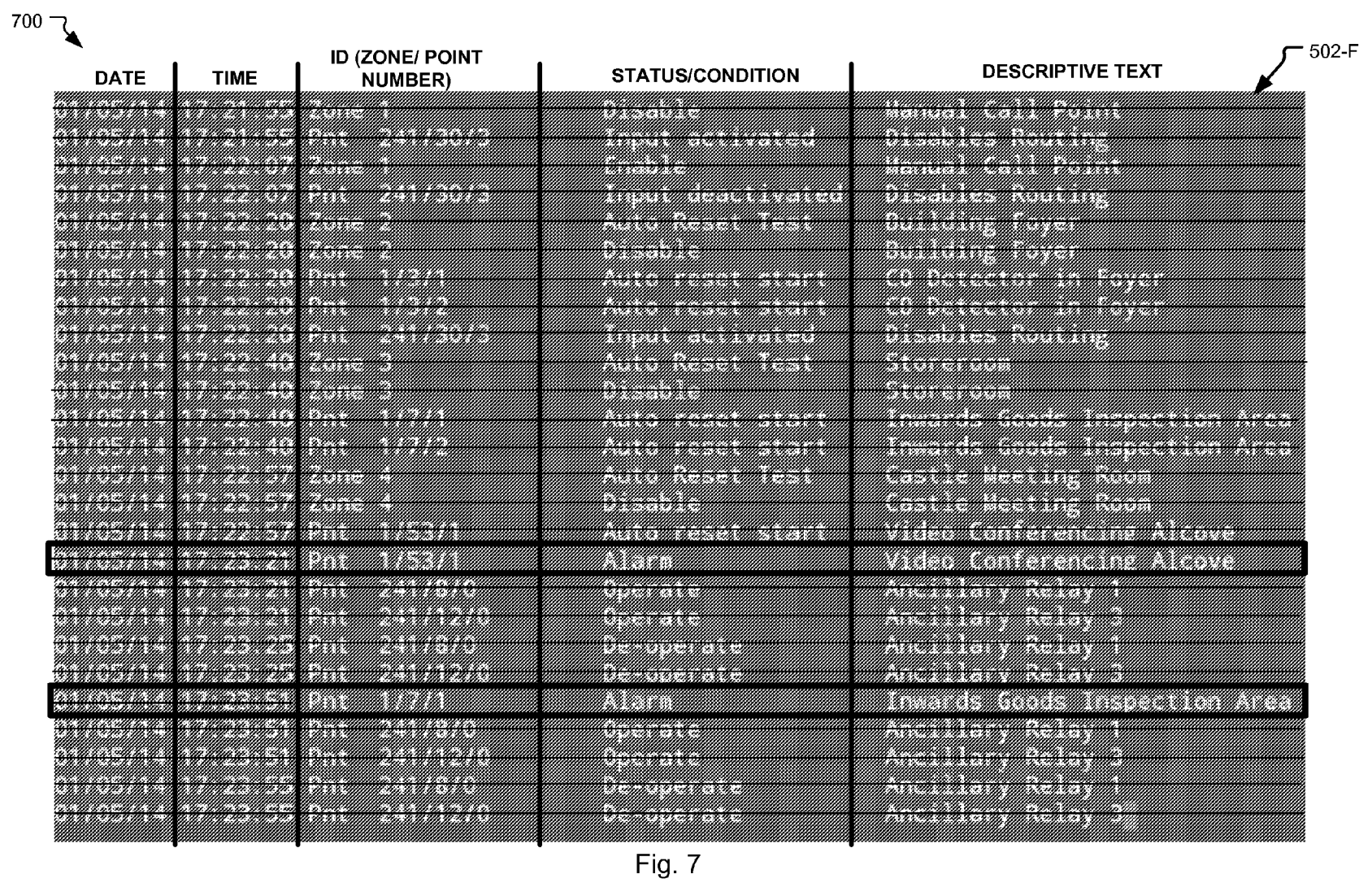

FIG. 7 is a table 700 illustrating filtered event data 502-F, which is filtered in order to reduce the stream of event data and only convert the unfiltered part of the stream of event data (i.e., the part with one or more keywords) to text-to-speech audio.

In the illustrated embodiment, the filtering options have been selected such that only event data that includes the keywords "alarm" or "fault" are converted to text to speech audio by the event data to speech mode app.

In the illustrated example, event data lines that include a "strikethrough" represent data that are being filtered out. Thus, these event data are not converted into text-to-speech audio. Conversely, the event data lines that include the keywords "alarm" or "fault" have been identified. Consequently, text-to-speech audio is generated and played for this event data.

In a typical implementation, the technician 108 configures filtering options from the keyword filter configuration interface. Additionally, keywords in individual event data lines may be further filtered to remove extraneous information and decrease the amount of generated text-to-speech audio. For example, within each line, the time and date information is not generated as text-to-speech audio, only the portions of the line relating to the location of the activated device (e.g., zone and point number), the status or condition of that device, e.g., alarm, and the descriptive text information describing its location within the building are converted to text-to-speech audio.

Alternatively, or in addition to, the technician may select keywords in order to filter out (i.e., ignore) specific event data in each line. Thus, rather than searching for keywords that must be included in order to generate text-to-speech audio, the filtering options enable event data to be ignored based on the presence of keywords.

In still other embodiments, more filtering options may be available. For example, filtering tools such as word stemming (reducing keywords to their root form), or Boolean logic (e.g., "and", "or", "not") could be used to identify and filter keywords, for example.

Individual lines of event data may be further filtered via intra-line keyword filtering. The configuration of the intra-line keyword filtering is essentially identical to the process described for configuring the status keyword filtering. That is, the technician selects user selectable elements to indicate whether event data should be converted to text-to-speech audio or ignored in response to identifying keywords in the event data.

While not shown in the illustrated embodiment, additional filtering options may available in alternative embodiments. For example, the interface may include additional buttons or filtering tools to enable the technician to filter event data with word stemming or Boolean logic, for example.

While this invention has been particularly shown and described with references to preferred embodiments thereof, it will be understood by those skilled in the art that various changes in form and details may be made therein without departing from the scope of the invention encompassed by the appended claims.

What is claimed is:

1. A system for enabling remote control of a fire alarm system, the system comprising:
a control panel that includes a control panel user interface for enabling a user to enter commands into the control panel and for the user to receive displayed information indicative of the status of the control panel; and
a mobile computing device that displays a simulated control panel user interface that is updated with the current displayed information of the control panel and for generating commands that are transferred to the control panel in response to user manipulation of the simulated control panel user interface.

2. The system according to claim 1, further comprising a remote access unit that receives the displayed information from the control panel and forwards the displayed information to mobile computing device.

3. The system according to claim 2, wherein the remote access unit receives commands from the mobile computing device and transfers the commands to the control panel.

4. The system according to claim 1, wherein the commands that are transferred to the control panel cause the control panel to perform the requested commands.

5. The system according to claim 1, wherein the commands are generated in response to input received on a touchscreen display of the mobile computing device, which is displaying the simulated control panel user interface.

6. The system according to claim 1, wherein the displayed information includes light emitting diode status information and text information displayed on the control panel.

7. The system according to claim 1, wherein the mobile computing device includes a touch-screen display and the simulated control panel user interface is displayed on the touch-screen display, the simulated control panel user interface including a simulated control panel display and simulated control panel keys.

8. The system according to claim 1, wherein the mobile computing device stores different simulated interfaces for different control panel models and then displays simulated interfaces that match a model of the control panel to which the commands are transferred.

9. The system according to claim 1, wherein the mobile computing device includes a touch-screen display and the simulated control panel user interface includes a simulated control panel display that is displayed on the touch-screen display, the simulated control panel displaying information concerning alarms and/or faults detected by the control panel.

10. A system for providing event data to a technician testing a fire alarm system, the system comprising:
a control panel monitoring fire detection devices and generating a stream of event data; and
a mobile computing device that receives the stream of event data of the control panel, displays the stream of event data, and generates text-to-speech audio of the event data.

11. The system according to claim 10, further comprising a remote access unit that receives the stream of event data from the control panel and sends the event data to mobile computing device.

12. The system according to claim 10, wherein the mobile computing device enables filtering of the stream of event data to reduce the amount of event data spoken and only converts part of the stream of event data to text-to-speech audio.

13. The system according to claim 12, wherein filtering of the stream of event data includes selecting keywords and identifying the selected keywords in the stream of event data and only generating text-to-speech audio for the parts of event data with the selected keywords.

14. The system according to claim 12, wherein filtering of the stream of event data includes selecting keywords and identifying the selected keywords in the stream of event data and ignoring the parts of event data with the selected keywords.

15. The system according to claim 10, wherein the mobile computing device further includes an application executing on the mobile computing device, the application bypassing any login screen in response to the mobile computing device receiving new event data from the control panel.

16. The system according to claim 10, wherein the mobile computing device saves the stream of event data to a log file.

17. The system according to claim 10, wherein the mobile computing device sends the log file and/or stream of event data to a central communication system, which stores the log file and/or stream of event data.

18. The system according to claim 10, wherein the stream of event data includes a time the event data was generated, a date the event data was generated, identification number of a device that was activated, status of the device that was activated, and descriptive text associated with the device.

19. The system according to claim 10, wherein the generated text-to-speech audio includes an identification of an activated fire detection device and a status of the fire detection device.

20. A method for providing event data to a technician testing a fire alarm system, the method comprising:
monitoring fire detection devices and generating a stream of event data; and
a mobile computing device receiving the stream of event data and generating text-to-speech audio of the event data.

21. The method according to claim 20, further comprising filtering of the stream of event data and only converting part of the stream of event data to text-to-speech audio.

22. The method according to claim 21, wherein filtering of the stream of event data includes selecting keywords and identifying the selected keywords in the stream of event data and only generating text-to-speech audio for the parts of event data based on the keywords.

23. The method according to claim 20, further comprising the mobile computing device saving the stream of event data to a log file.

24. The method according to claim 20, wherein the generated text-to-speech audio includes an identification of an activated fire detection device and a status of the fire detection device.

25. A system for testing a fire alarm system, the system comprising:
a control panel monitoring fire detection devices and generating a stream of event data;
a remote access unit for providing remote wireless access and including at least one relay; and
a mobile computing device that receives the stream of event data of the control panel via the remote access unit, and enables user control of the relay.

26. The system according to claim 25, wherein the relay resets the control panel.

27. The system according to claim 25, wherein the relay is used to activate a drain solenoid.

28. The system according to claim 25, further comprising setting a period of time for which the relay is activated.

29. A method for testing a fire alarm system, the method comprising:
monitoring fire detection devices and generating a stream of event data;
providing remote wireless access and control over at least one relay for opening or closing a circuit; and
receiving the stream of event data of the control panel at a mobile computing device that enables user control of the relay.

30. A mobile computing device that receives event data from a control panel monitoring fire detection devices, the mobile computing device displaying the stream of event data and generating text-to-speech audio of the event data.

* * * * *